June 21, 1938. J. P. CRANDALL 2,121,070
MACHINE FOR DELIVERING MEASURED CHARGES OF FLUENT MATERIAL
Filed Jan. 21, 1937 2 Sheets-Sheet 1
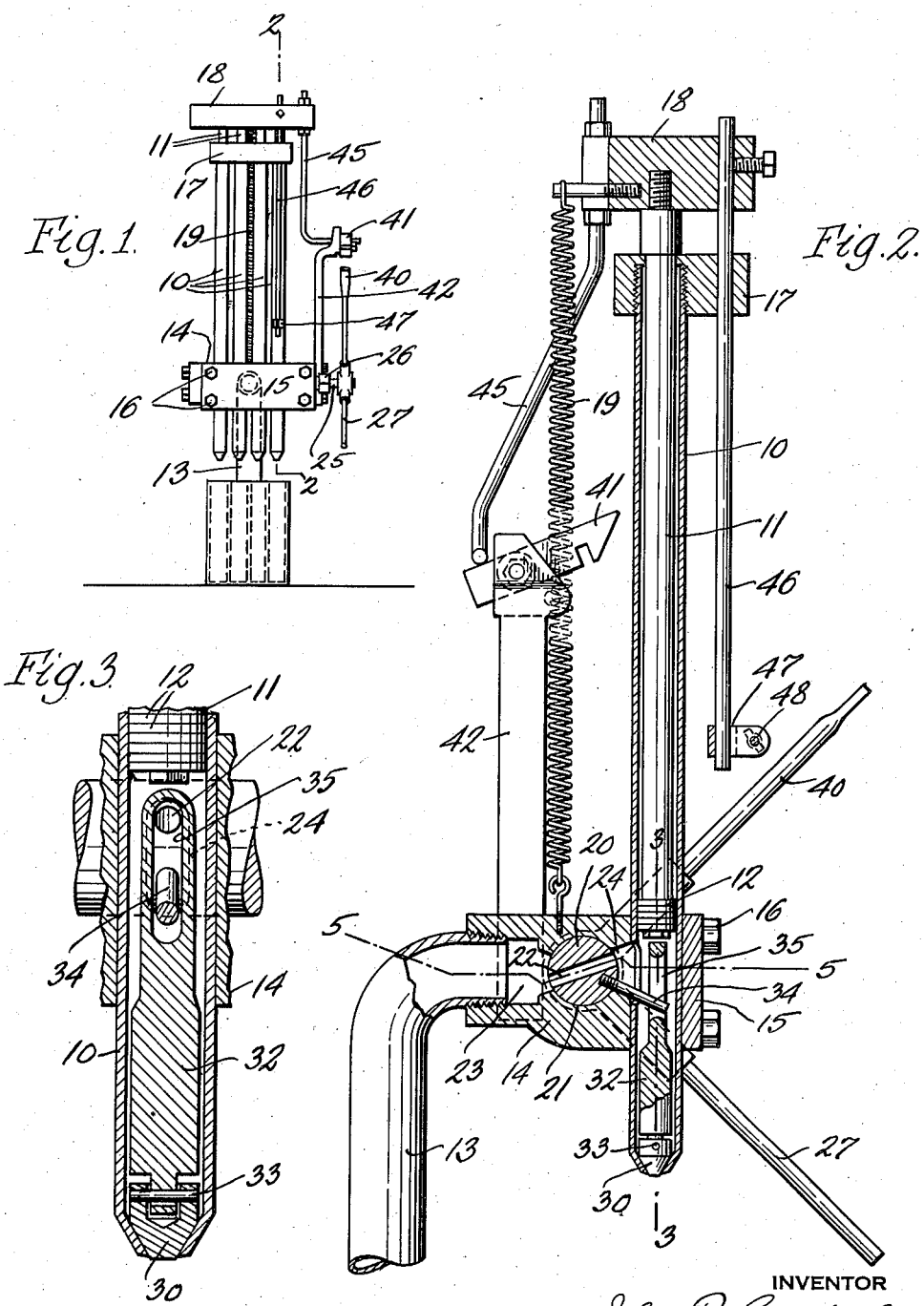
INVENTOR
John P. Crandall
BY
Parker, Brockwow & Farmer.
ATTORNEYS June 21, 1938.  J. P. CRANDALL  2,121,070
MACHINE FOR DELIVERING MEASURED CHARGES OF FLUENT MATERIAL
Filed Jan. 21, 1937  2 Sheets-Sheet 2
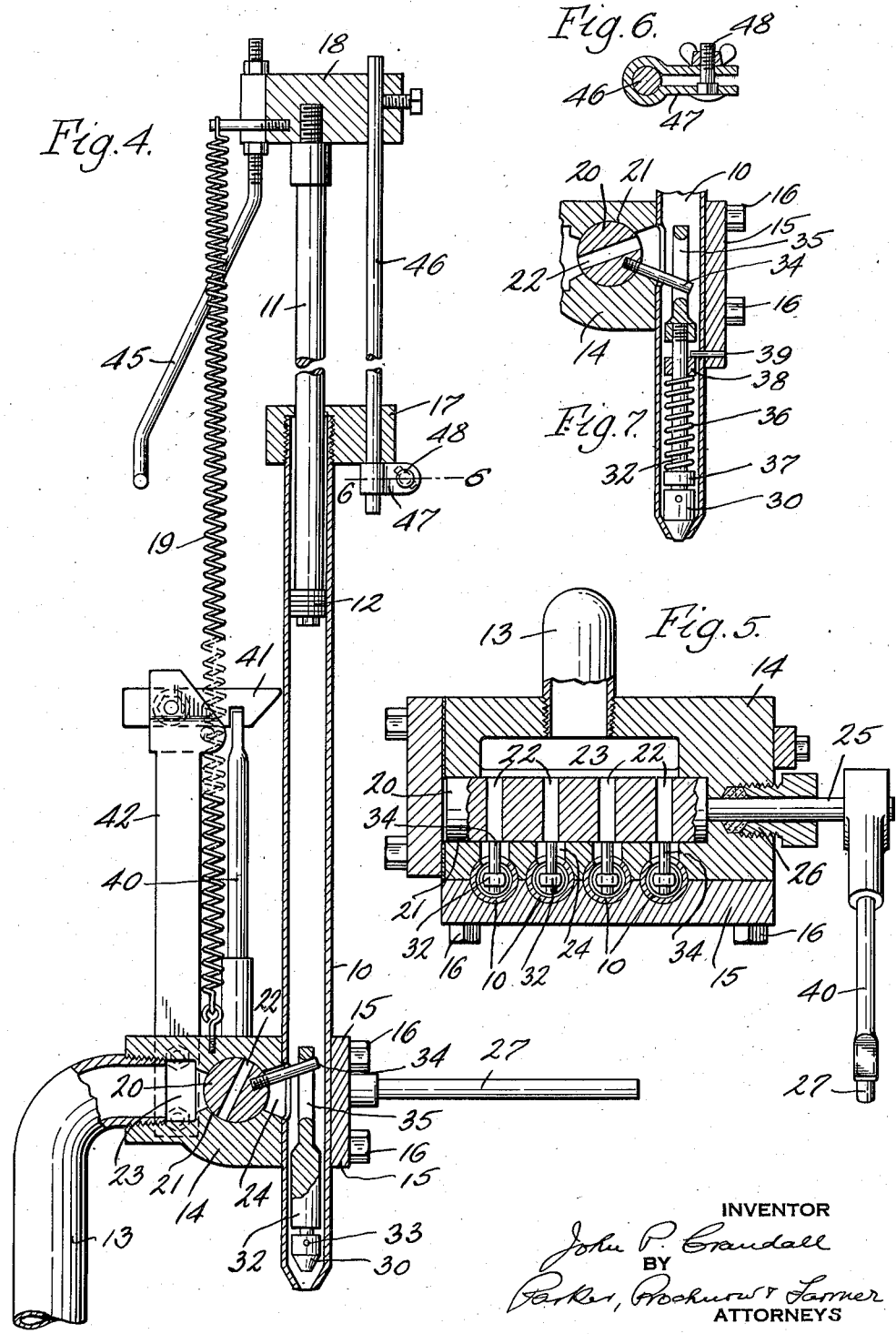
INVENTOR
John P. Crandall
BY
Parker, Brockwurst & Larner
ATTORNEYS Patented June 21, 1938

2,121,070

UNITED STATES PATENT OFFICE 2,121,070

MACHINE FOR DELIVERING MEASURED CHARGES OF FLUENT MATERIAL

John P. Crandall, Buffalo, N. Y.

Application January 21, 1937, Serial No. 121,384

9 Claims. (Cl. 221—103)

This invention relates to machines for filling receptacles with liquid or fluent materials, or for dispensing such materials in desired measured quantities. While machines embodying the invention are especially suited for filling small receptacles and collapsible tubes with liquids and materials, such as pastes and creams that are commonly sold in collapsible tubes, the invention is not necessarily restricted in application to machines for such purposes, but is applicable to machines for other uses involving the delivery of fluent materials in measured quantities. Furthermore, machines embodying the invention preferably comprise multiple filling devices adapted for simultaneously filling a plurality of receptacles, but the invention is not restricted to such multiple machines.

The objects of the invention are to provide a desirable, simple and inexpensive machine by means of which receptacles can be rapidly and economically filled with accurately measured charges of material; which operates automatically to measure the charge of material and then, upon actuation of a control device, automatically discharges the measured charge; in which the material measuring device is actuated by the pressure of the material supplied thereto; in which a piston for discharging the material from a measuring cylinder is actuated to fill the cylinder by the pressure under which the material is supplied to the measuring cylinder and is automatically operated, when released, to discharge a measured charge of material; in which the measuring cylinder is furnished with supply and discharge valves which, when a predetermined charge of material has entered the cylinder, are operated to shut off the supply and permit discharge of the material from the cylinder, and then operate automatically to close the discharge valve and open the supply valve to again deliver a predetermined charge of material to the cylinder; which is operated automatically by the supply pressure to charge the measuring cylinder while the receptacle is being placed in position to receive the material, and then upon actuation of a control device, automatically delivers the charge of material into the receptacle, shuts off the discharge, and then connects the measuring cylinder with the source of supply for again charging the measuring cylinder while the filled receptacle is being removed and replaced by an empty receptacle to receive the next charge of material; and which has the other features of improvement and advantage hereinafter described and set forth in the claims.

In the accompanying drawings, which illustrate a physical embodiment of the invention:

Fig. 1 is a front elevation, on a reduced scale, of a machine embodying the invention.

Fig. 2 is an enlarged side elevation thereof, partly in section, on line 2—2, Fig. 1, showing the position of the parts at the completion of the delivery of the charge of material.

Fig. 3 is a sectional elevation on a larger scale on line 3—3, Fig. 2.

Fig. 4 is a view similar to Fig. 2, but showing the position of the parts at the commencement of the charge delivering stroke of the machine.

Fig. 5 is a sectional plan view on line 5—5, Fig. 2.

Fig. 6 is a sectional plan of the adjustable stop for determining the size of the charge of material delivered.

Fig. 7 is a sectional elevation of the valve mechanism for the measuring cylinder, showing modification of the discharge valve.

Referring to said drawings, 10 represents an upright measuring cylinder having a discharge opening at its lower end, and 11 is a piston or plunger arranged to reciprocate vertically in the cylinder 10 and having at its lower end suitable washers or packing 12 slidably fitting the cylinder so that the piston will be raised by the pressure of material delivered under pressure into the cylinder beneath the piston, and the material will be forced out of the cylinder through its bottom discharge opening by downward movement of the piston. The liquid or fluent material may be delivered into the cylinder below the piston from a supply pipe 13 leading from a pump, reservoir or other suitable source of material under pressure by establishing communication between the supply pipe and cylinder, when the material will enter the cylinder under pressure sufficient to raise the piston and permit the cylinder to be filled to the extent determined by the upward movement of the piston. As shown in the drawings, the supply pipe 13 is attached at its laterally extending upper end to and supports a valve block or casing 14 to which the measuring cylinder is secured at its lower portion so as to be supported thereby.

The machine shown has four of the measuring cylinders 10, which are alike and arranged parallel to each other in the same vertical plane and are stationarily secured to the valve block 14 by a clamping head 15 secured by screws 16 to the valve block, and the upper ends of the cylinders are secured to and held in position by a head block 17 to which the cylinders may be attached by screwing the threaded upper ends of the cylinders into threaded holes in the head block. One of the pistons 11 occupies each of the cylinders 10, and the upper ends of the pistons are connected to a common cross head 18, into threaded holes in which the threaded upper ends of the pistons may be screwed. The pistons are movable vertically in and out through the open, upper ends of the cylinders and registering holes in the head block 17, and the weight of the pistons and cross head tends to move the pistons downwardly in the cylinders. If necessary, this weight may be supplemented by a spring, as helical spring 19, attached at its ends to the valve block 14 and cross head 18. The weight of the pistons and cross head supplemented, if necessary by the pull of the spring 19, is sufficient to move the pistons downwardly against the resistance of the material in the cylinders below the pistons and force the material out through bottom discharge openings of the cylinders. Any number, one or more of the cylinders with their pistons, may be used, depending upon the desired capacity of the machine, and, while, as shown, the cylinders are supported from the supply pipe 13, the cylinders and other operative parts of the machine can, if desired, be mounted on a stationary frame, not shown, of any suitable form and construction.

20 indicates the movable member of an inlet or supply valve and preferably consists of a cylindrical plug arranged horizontally transversely of the cylinders 10 to turn in a cylindrical bore 21 in the valve block, the plug being provided with transverse ports 22, one for each cylinder 10. In the open position of the valve, shown in Fig. 2, the ports 22 place the cylinders 10 in communication with the supply pipe 13 through a cavity 23 in the valve body communicating with the pipe and passages 24 extending from the bore 21 to registering holes through the sides of the cylinders. When the valve is in this open position, the material can pass from the supply pipe 13 through the cavity 23, valve ports 22 and passages 24 into the several measuring cylinders.

The valve plug 20 is provided at one end with an axial stem 25 which extends out of the valve block through a suitable packing gland 26 and has a handle 27 secured to its outer end for turning the plug.

Arranged in the lower end of each measuring cylinder 10 is a discharge valve 30 adapted to move into and out of contact with a seat in the cylinder for stopping and permitting the discharge of material from the cylinder. As shown, this discharge valve is conical and arranged to engage a conical seat in the tapered lower end of the cylinder, and is loosely attached to the lower end of a valve stem 32 movable vertically in the cylinder, as by a cross pin 33 in the valve extending through a hole in the reduced lower end of the valve stem, which loosely enters a socket in the valve. The joint thus formed between the valve and valve stem is sufficiently loose to allow limited universal movement of the valve on the stem so that the valve will automatically adjust itself to its seat and when seated will insure a tight closure of the discharge opening. The valve stem 32 is operatively connected with the supply valve 20, as by a pin 34 projecting from the valve plug 20 through the passage 24 into a vertical slot 35 in the upper end of the valve stem. The slot 35 is of such length that when the supply valve is turned to close it, the pin 34 will move upwardly in the slot without lifting the discharge valve until the valve plug 20 has been turned far enough to shut off the supply to the measuring cylinder, and in the further closing movement of the supply valve plug, the pin 34 will engage the upper end of the slot 35 and lift the discharge valve off of its seat to permit discharge of the material from the cylinder. Thus, in the operation of the valves, the discharge valve remains closed and prevents escape of material from the measuring cylinder until after the supply valve is closed to prevent ingress of material into the cylinder, and then is opened to allow the discharge of the material from the cylinder. On the other hand, when the supply valve plug 20 is turned to admit material to the cylinder, the pin 34 moves downwardly and the discharge valve is lowered against its seat to shut off discharge from the cylinder. As shown in Figs. 2–4, the discharge valve and its stem 32 may be made heavy enough for the valve to be seated by gravity under the pressure of the material in the cylinder thereon, or the valve may be closed by a spring, as shown in Fig. 7, in which a coil spring 36 surrounds the valve stem between a collar 37 thereon and a ring 38 through which the valve stem slides and which is held against upward movement, as by a stop pin 39 fixed in the side of the cylinder.

The supply valve is retained in its closed position, until released, by latching means comprising, as shown, an arm 40 fixed to the stem of the valve plug 20 and adapted to engage a latch 41 pivoted to the upper end of a bracket 42 secured to and rising from the valve block 14. In closing the supply valve, the upper end of the arm 40 engages the bevelled forward end of the latch and lifts it, and when the end of the arm registers with a notch in the lower edge of the latch, the latter will drop and, by engagement of the end of the arm in the notch of the latch, will hold the arm and the valve plug in closed position. As shown, the weight of the latch forwardly of its pivot is sufficient to cause the latch to drop by gravity into holding engagement with the arm 40, but a spring actuated latch could be provided if desired.

In the operation of the machine, assuming the supply valve to be open and the discharge valve closed, as shown in Fig. 2, the supply pump, a shut-off valve or other starting means (not shown) is actuated to permit the delivery of the material under pressure from the source of supply to the measuring cylinders. The material will pass through the ports of the supply valve into the measuring cylinders and will force the pistons 11 upwardly in the cylinders until they are arrested, as presently described, the material thus filling the cylinders beneath the raised pistons. When the cylinders have been filled to the extent permitted by the upward movement of the pistons, the operator closes the supply valve by swinging its handle 27 upwardly until the latch arm engages and is held by the latch 41. During the upward movement of the pistons and filling of the measuring cylinders, the receptacles to be filled, corresponding in number with the number of cylinders, can be placed in receiving position, one beneath the lower end of each cylinder. When the supply valve has been closed and the pressure on the material in the cylinder thus cut off, the pistons will descend, by gravity, and by the pull of the spring 19, if the spring is employed, and will force the material out of the open, lower ends of the cylinders into the receptacles. As the pistons approach the limit of their downward movement, a trip rod 45 suitably secured to the piston cross head, engages the rear end of the latch 41 and lifts the front end of the latch, thereby releasing the latch arm 40, whereupon the supply valve will be turned from its closed to its open position by the overhanging weight of its handle 27 and the latch arm 40, and cause the closing of the discharge valve, as before explained, to prevent further discharge of the material from the cylinders. When the supply valve is thus opened and the discharge valve closed, the material will again enter the cylinders and move the pistons upward for filling the cylinders, and during this upward movement, the filled receptacles can be removed and replaced by empty receptacles to receive the charges of material at the next descent of the pistons.

Adjustable means are provided for variably limiting the intake stroke of the pistons in the cylinders thereby to obtain measured charges of sizes, suitable for filling different sized receptacles. The means shown for this purpose comprises a stop rod 46 carried by the piston cross head and extending downwardly therefrom through a guide hole in the upper cylinder block 17 and provided, below the latter, with an adjustable stop 47, which may consist of a split collar adjustably clamped on the rod by a screw and wing nut 48. The upward or intake movement of the pistons will be limited by the engagement of this stop 47 with the bottom of the upper cylinder block 17, and by appropriately adjusting the stop 47 on the stop rod, the pistons can be stopped at different points suitable for obtaining different measured charges, as may be required, for delivering or filling the receptacles with required measured quantities of material.

I claim as my invention:

1. In a machine for delivering measured charges of fluent material, the combination of a measuring cylinder having a discharge opening, means for supplying the material under pressure to the cylinder, a piston in said cylinder which is moved in one direction by the pressure of the material to allow a charge of material to enter the cylinder, means operable to open and close communication between the supply means and the cylinder and to open and close said discharge opening, said means being actuated to shut off the supply to the cylinder when a charge has entered the cylinder, means for moving the piston to discharge the material from the cylinder when the supply to the cylinder is shut off, and means controlled by the discharge movement of the piston to close the discharge opening and open communication between the supply means and cylinder.

2. In a machine for delivering measured charges of fluent material, the combination of a measuring cylinder having a discharge opening, means for supplying material under pressure to the cylinder, a piston in the cylinder which is moved in one direction by the pressure of the material to allow ingress of material into the cylinder, means for producing opposite movement of the piston for discharging the material from the cylinder, and supply and discharge control means actuated to shut off the supply of material to the cylinder and open the cylinder discharge opening, and which operates when the cylinder is discharged to close the discharge opening and admit material from the supply means to the cylinder.

3. In a machine for delivering measured charges of fluent material, the combination of a measuring cylinder having a discharge opening, means for supplying material under pressure to the cylinder, a piston in the cylinder which is moved in one direction by the pressure of the material to allow ingress of material into the cylinder, means for producing opposite movement of the piston for discharging the material from the cylinder, supply and discharge control means actuated to shut off the supply of material to the cylinder and open the cylinder discharge opening, and which operates when the cylinder is discharged to close the discharge opening and admit material from the supply means to the cylinder, and adjustable means for variably limiting the movement of the piston by the pressure of the material to vary the charge of material admitted to the cylinder.

4. In a machine for delivering measured charges of fluent material, the combination of a measuring cylinder having a discharge opening, means for supplying material under pressure to the cylinder, a piston in the cylinder which is moved in one direction by the pressure of the material to allow ingress of material into the cylinder, means for producing opposite movement of the piston for discharging the material from the cylinder, and supply and discharge control means actuated to shut off the supply of material to the cylinder and open the cylinder discharge opening, means for holding said control means in a position to shut off the supply to the cylinder, and means actuated by the discharge movement of the piston to release said holding means and cause movement of the control means to shut off the discharge of material from the cylinder and supply material to the cylinder.

5. In a machine for delivering measured charges of fluent material, the combination of a measuring cylinder having a discharge opening, means for supplying material under pressure to the cylinder, a piston in the cylinder which is moved in one direction by the pressure of the material to allow ingress of material into the cylinder, means for producing opposite movement of the piston for discharging the material from the cylinder, a supply valve controlling the supply of material to the cylinder, a discharge valve controlling the discharge of material from the cylinder, means for closing said supply valve and opening said discharge valve, a latch for holding said supply valve closed and said discharge valve open during the discharge movement of the piston, and means for automatically tripping said latch at the end of the discharge movement of the piston for closing the discharge valve and opening the supply valve.

6. In a machine for delivering measured charges of fluent material, the combination of a measuring cylinder having a discharge opening, means for supplying material under pressure to the cylinder, a piston in the cylinder which is moved in one direction by the pressure of the material to allow ingress of material into the cylinder, means for producing opposite movement of the piston for discharging the material from the cylinder, a supply valve controlling the supply of material to the cylinder, a discharge valve controlling the discharge of material from the cylinder, means for closing said supply valve and opening said discharge valve, a latch for holding said supply valve closed and said discharge valve open during the discharge movement of the piston, a trip device movable with said piston which trips said latch to release said valves near the end of the discharge movement of the piston, and means operating automatically when said valves are released to close the discharge valve and open the supply valve.

7. In a machine for delivering measured charges of fluent material, the combination of a measuring cylinder having a discharge opening, means for supplying material under pressure to the cylinder, a piston in the cylinder which is moved in one direction by the pressure of the material to allow ingress of material into the cylinder, means for producing opposite movement of the piston for discharging the material from the cylinder, a supply valve having a turn plug for controlling the supply of material to the cylinder, a discharge valve movable lengthwise in the cylinder to open and close said discharge opening, connections between said valves operating when said supply valve is closed to open said discharge valve, latch means for holding said supply valve closed and said discharge valve open during the discharge movement of the piston, means operating automatically when the piston nears the end of its discharge movement to trip said latch means, and means operating when said valves are released to close said discharge valve and open said supply valve.

8. In a machine for delivering measured quantities of fluent material, the combination of a plurality of parallel measuring cylinders having discharge openings, a piston movable in each cylinder, means for supplying material under pressure to said cylinders, said pistons being moved in one direction by the pressure of the material to allow ingress of material into the cylinders, and operable in the opposite direction for discharging the material from the cylinders, a discharge valve for each cylinder controlling the discharge opening of the cylinder, a supply valve having a turn plug common to the several cylinders and arranged with its axis transverse to the axes of said cylinders and movable to open and close communication between the supply means and said cylinders, means for opening and closing said supply valve, and connections between the supply valve and said discharge valves for opening the discharge valves when the supply valve is closed and for closing the discharge valve when opening the supply valve.

9. In a machine for delivering measured charges of fluent material, the combination of a measuring cylinder having a discharge opening, means for supplying material under pressure to the cylinder, a piston in the cylinder which is moved in one direction by the pressure of the material to allow ingress of material into the cylinder, spring or weight means which produces opposite movement of the piston for discharging the material from the cylinder, and supply and discharge control means actuated to shut off the supply of material to the cylinder and open the cylinder discharge opening, and mechanism which operates automatically when the cylinder is discharged to actuate said control means to close the discharge opening and admit material from the supply means to the cylinder.

JOHN P. CRANDALL.